US007901622B2

(12) United States Patent
Zimmer

(10) Patent No.: US 7,901,622 B2
(45) Date of Patent: Mar. 8, 2011

(54) TEST ELEMENT WITH A CAPILLARY FOR TRANSPORT OF A LIQUID SAMPLE

(75) Inventor: Volker Zimmer, Laumersheim (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 0 days.

(21) Appl. No.: 11/467,376

(22) Filed: Aug. 25, 2006

(65) Prior Publication Data

US 2007/0041869 A1 Feb. 22, 2007

Related U.S. Application Data

(63) Continuation of application No. PCT/EP2005/001882, filed on Feb. 23, 2005.

(30) Foreign Application Priority Data

Feb. 25, 2004 (DE) ......................... 10 2004 009 012

(51) Int. Cl.
*G01N 21/00* (2006.01)
*B01L 3/02* (2006.01)

(52) U.S. Cl. .............................. 422/57; 422/58; 422/100

(58) Field of Classification Search .................... 422/50, 422/68.1, 81, 82, 100, 101, 57, 58; 436/43, 436/174, 177, 178, 180, 63, 66, 86
See application file for complete search history.

(56) References Cited

U.S. PATENT DOCUMENTS

| | | | | |
|---|---|---|---|---|
| 5,458,852 | A | 10/1995 | Buechler | |
| 7,066,453 | B2 * | 6/2006 | Burns et al. | 261/147 |
| 2002/0125135 | A1 * | 9/2002 | Derand et al. | 204/454 |
| 2004/0028566 | A1 * | 2/2004 | Ko et al. | 422/100 |
| 2004/0115831 | A1 * | 6/2004 | Meathrel et al. | 436/514 |

FOREIGN PATENT DOCUMENTS

| | | | |
|---|---|---|---|
| DE | 197 53 847 | A1 | 6/1999 |
| EP | 0 596 104 | B1 | 12/1993 |
| EP | 0 821 233 | B1 | 1/1998 |
| EP | 0 821 234 | B1 | 1/1998 |
| EP | 0 977 032 | A1 | 2/2000 |
| EP | 1 175 940 | B1 | 1/2002 |
| WO | WO 95/17965 | A1 | 7/1995 |
| WO | WO 97/02487 | A1 | 1/1997 |
| WO | WO 99/29435 | A2 | 6/1999 |
| WO | WO 01/25138 | A1 | 4/2001 |

* cited by examiner

*Primary Examiner* — Lore Jarrett

(74) *Attorney, Agent, or Firm* — Baker & Daniels LLP

(57) ABSTRACT

The invention relates to a test element with at least one capillary for continuous transport of a liquid sample in a transport direction, with several zones succeeding one another in the transport direction in the capillary and containing different materials with which water has different contact angles α.

6 Claims, 3 Drawing Sheets

TEST ELEMENT WITH A CAPILLARY FOR TRANSPORT OF A LIQUID SAMPLE

REFERENCE TO RELATED APPLICATIONS

The present application is a Continuation of PCT Patent Application No. PCT/EP2005/001882, filed Feb. 23, 2005 which claims priority to German Patent Application No. 10 2004 009 012.2, filed Feb. 25, 2004, which are hereby incorporated by reference in their entirety.

TECHNICAL FIELD

The invention generally relates to a test element having a capillary for transport of a liquid sample in a transport device. The capillary has different zones succeeding one another in the transport direction in the capillary that exhibit different hydrophilicity.

BACKGROUND

For analysis of samples, for example body fluids such as blood or urine, test element analysis systems are often used in which the samples to be analyzed are present on a test element and, if appropriate, react with one or more reagents on the test element before they are analyzed. Optical, in particular photometric, evaluation of test elements is one of the most common methods of rapid determination of the concentration of analytes in the sample. Photometric evaluations are generally used in the fields of analysis, environmental analysis and, above all, in medical diagnostics.

There are different kinds of test elements. For example, substantially square slides are known in the middle of which a multilayer test field is located. Diagnostic test elements of strip shape are referred to as test strips. Test elements are widely described in the prior art, for example in documents DE-A 197 53 847, EP-A-0 821 233, EP-A 0 821 234 or WO 97/02487. The capillary gap test elements also known from the prior art are test elements in which the sample liquid is conveyed from a sample application site to a remote sample detection site with the aid of capillary forces in a transport channel (capillary channel, capillary gap) in order to undergo a detection reaction there.

EP-B1 0 596 104 discloses a diagnostic assay device with a diagnostic element comprising a capillary space through which a reaction mixture flows, and a non-absorbent surface which is able to immobilize at least one target ligand from the reaction mixture in at least one zone, the non-absorbent surface having particles immobilized thereon which comprise an immobilized receptor. This assay device contains a time gate which comprises at least one hydrophobic zone in the capillary space that delays the flow through the capillary space to the at least one zone until the hydrophobic zone is made sufficiently hydrophilic through binding of a component of the reaction mixture. The surfaces of the capillary are smooth or have grooves running parallel or perpendicular to the flow of the sample. The different speed of flow of the reagents is achieved with the aid of gaps, and the variation in the size of the respective gaps modifies the capillarity in the gap and, consequently, the flow of the reaction mixture.

Test elements known in the prior art generally consist of vertical or horizontal structures through which a liquid sample (e.g. blood, plasma, urine) flows. Spatial separation of reagents for preliminary reactions, suppression reactions (e.g. vitamin C suppression), enrichment of substances, or reagent separation because of incompatibility in these test elements is made possible by a vertical structure of reagent layers (for example impregnated tissues, papers, membranes or microporous films). In a horizontal structure, different reagent zones, assembled or discretely impregnated, can be produced one behind the other. However, control of the dwell time in the respective zones or compartments has hitherto been possible only by mechanical action from outside (for example Reflotron, reaction valve). Detection of various parameters in a rapid test often demands control of the dwell time in reaction or enrichment zones, e.g. as a function of the reaction time or dissolution time. Mechanical control of this dwell time by an apparatus, however, requires a complex apparatus structure, which entails high costs.

Therefore it is one of the objects of the present invention is to make available a test element which avoids the disadvantages of the prior art.

SUMMARY

The test element according to the present invention, is intended to permit predetermined dwell times of a liquid sample in different zones by means of a simple structure, at low cost and without additional control. In this way it will be possible to achieve spatial and temporal separation of reactions of the sample on the test element.

The test element comprises at least one capillary for continuous transport of a liquid sample in a transport direction, several zones succeeding one another in the transport direction in the capillary and containing different materials with which water has different contact angles $\alpha$.

On the basis of the contact angle ox which water (or a water-containing liquid sample) forms with the solid inside surface of the capillary, the wetting tendency and, consequently, the flow velocity of the liquid sample in the capillary can be deduced. When a drop of liquid comes into contact with a solid base, two extreme cases may arise:

Complete wetting: the adhesion forces are greater than the cohesion forces. The liquid will thus spread out across the surface of the solid body;

Incomplete wetting: the adhesion forces are (considerably) smaller than the cohesion forces. The liquid will therefore contract into a spherical drop.

The wetting tendency and, consequently, the flow velocity of the liquid sample in the capillary are greater, the smaller the contact angle $\alpha$. The filling time for filling a capillary per unit distance increases exponentially with the contact angle. In the case of samples containing water, the contact angle of water suffices to characterize the material-specific capillary properties. The test element according to the invention exploits this effect by dividing the inside surface of the capillary into zones with different materials, so that a liquid sample in these zones of the capillary forms different contact angles $\alpha$ and thus continuously flows at different speeds through these zones of the capillary. In this way, it is possible to specifically influence how long the liquid sample is located in the respective zone and, for example, reacts with reagents located there. Consequently, in a capillary of a test element according to the invention, different measurements can be performed one after another, in particular also complex measurements which are made possible by the zoned structure of the capillary and by the resulting temporal separation of the reaction steps. In the case of a parallel arrangement of several capillaries in one test element, different multiple measurements can even be carried out simultaneously and in parallel using one liquid sample.

The liquid sample is a water-containing sample, for example plasma, blood, interstitial fluid, urine, water analysis samples, in particular waste water, saliva or sweat.

The transport direction is the direction in which the sample is transported through the capillary, from a sample application site of the test element, by means of capillary forces.

The zones succeeding one another in the transport direction in the capillary comprise at least one reaction, enrichment or detection zone and at least one delay zone, the capillary expediently having one delay zone lying in each case between two different zones. A reaction zone in this case is a zone in which the liquid sample reacts with reagents placed there. This can, for example, include preliminary reactions, suppression reactions, or fields for reagent separation. In an enrichment zone, a constituent of the liquid sample is enriched. A detection zone is configured such that certain constituents of the liquid sample, or their reaction with the reagents, can be detected. One example of this is a zone in which a detection reaction for glucose in a blood sample and its photometric determination take place. In a delay zone, the flow of the sample is slowed down in such a way that, in the transport direction, it reaches a zone following on from a delay zone only with a time delay. In the reaction, enrichment and detection zones, the sample is intended to rapidly distribute so that it can react with the reagents placed there. In the delay zones, the sample is intended to flow more slowly, so that it needs a certain amount of time to move from the preceding zone through the respective delay zone. Therefore, the contact angle ox with water is smaller in the reaction, enrichment or detection zones (for rapid filling) and greater in the delay zones (for "holding back" the sample, i.e. for slow filling). Located in each case between two different zones, there is expediently (but not essentially) a delay zone for "separating" reactions in the two other zones.

The transport direction, zones containing materials with smaller contact angles $\alpha$ in relation to water, preferably $0°<\alpha<30°$, alternate with zones containing materials with greater contact angles $\alpha$ in relation to water, preferably $30°<\alpha<90°$. In the context of this invention, a "smaller" contact angle signifies that this has a smaller value relative to the "greater" contact angle, and the smaller contact angle can in particular lie between 0° and 30° and the greater contact angle between 30° and 90°. The zones containing materials with smaller contact angles in relation to water, preferably $\alpha<30°$, are more rapid filling stretches, each one followed by a slower filling stretch with greater contact angle $\alpha$, $\alpha>30°$. The contact angle in the zones with $\alpha>30°$ in relation to water is 50° to 85°.

The capillary comprises four inside walls and has a substantially rectangular cross section. The shorter sides of the substantially rectangular cross section are the distances relevant to the acting capillary forces in the capillary. This shape of the capillary has the advantage that it can be produced for the test element according to the invention in a small number of work stages (see method according to the invention as described below). The four inside walls can be made without great difficulty from different materials with different water contact angles. In zones with smaller contact angle, in particular with $\alpha<30°$, it is sufficient, for rapid filling of these zones with a liquid sample, if only one of the four inside walls has a surface with a smaller contact angle, in particular $\alpha<30°$. With the remaining three inside walls, water can also form greater contact angles.

Along the length (stretch) of the reaction, enrichment and detection zones, the capillary therefore preferably contains at least one inside wall having a surface with a smaller contact angle in relation to water, in particular with $\alpha<30°$. Along the length of the delay zones, the capillary by contrast comprises, if possible on all inside walls, surfaces with a greater contact angle in relation to water, in particular $\alpha>30°$. Here, the liquid sample is intended to spread if possible equally slowly along all four inside walls of the capillary in the transport direction.

The zones in the capillary which comprise surface materials with a smaller contact angle in relation to water, in particular $\alpha<30°$, contain an element oxidized at least on the surface with boiling water or steam or an alloy oxidized at least on the surface, the element deriving from the group Al, Si, Ti, V, Cr, Mn, Fe, Cu, Ni, Zn, Ga, Ge, Zr, Nb, Cd, In, Sn, Sb, or the alloy containing at least two elements from the group Al, Si, Ti, V, Cr, Mn, Fe, Cu, Ni, Zn, Ga, Ge, Zr, Nb, Cd, In, Sn, Sb, Mg, Ca, Sr, Ba. A method for producing such a surface coating is known from WO 99/29435. On an aluminium oxide surface coating (AluOx) produced in this way, water for example has a contact angle $\alpha<10°$. The walls of the capillary can contain a material from the group plastic, metal, glass, ceramic, paper, nonwoven fabric or cardboard, which, on its surface directed towards the inside of the capillary, supports the layer oxidized with boiling water or steam. The oxidized elements are Al, Si, Ti or Zr, and oxidized alloys are those with Al, Si, Ti or Zr, which are alloyed with at least one element from the group Mg, Ca, Sr or Ba.

The zones in the capillary which have materials with a contact angle in relation to water of $\alpha>30°$, contain at least one material from the following group: polyethylene (PE), polyester, in particular polyethylene terephthalate (PET), polyamides (PA), polycarbonate (PC), acrylonitrile-butadiene-styrene (ABS), polystyrene (PS), polyvinylchloride (PVC), cellulose derivatives (e.g. cellulose acetates (CA), cellulose nitrate (CN)), polyvinyl pyrrolidone (PVP), polyvinyl alcohols (both in particular long-chain, water-insoluble types), polyurethanes (PUR), polymethylmethacrylate (PMMA), polypropylene (PP), waxes, fluorinated hydrocarbons, e.g. polytetra-fluoroethylene (PTFE), unpassivated vapour-deposited metal.

The following materials effect a short delay time: cellulose derivatives (e.g. cellulose acetates (CA) and cellulose nitrate (CN)), polyamides (PA), polyvinyl pyrrolidone (PVP), polyvinyl alcohols (both in particular long-chain, water-insoluble types) and polyurethanes (PUR).

Medium delay times are obtained with: polymethylmethacrylate (PMMA), polycarbonate (PC), polyvinyl chloride (PVC), polyester, in particular polyethylene terephthalate (PET), polystyrene (PS) and acrylonitrile-butadiene-styrene (ABS).

Long delay times are obtained using: polyethylene (PE), polypropylene (PP), waxes, fluorinated hydrocarbons, e.g. polytetrafluoroethylene (PTFE), and unpassivated vapour-deposited metal. Waxes here include all materials technically designated as waxes, not just purely chemically.

The inwardly directed surfaces of the capillary of the test element according to the invention preferably have at least one of these materials in the delay zones.

The reagents needed in the capillary are present in the area of the reaction, enrichment or detection zones. These reagents are brought by suitable methods into the respective zones, for example by a coating method. For example, it is possible to use an aqueous solution of the reagents, which is placed there. Suitable methods are, for example, the ink-jet method, coating with rollers, e.g. engraved rollers, flexographic printing, screen printing, pad printing, flow or cast technology.

The solution is then dried, i.e. the solvent (e.g. water) is evaporated.

The invention further relates to a method for producing capillaries for test elements, with the following method steps:

applying at least one delay material, with a greater contact angle in relation to water, preferably $30<\alpha<90°$, and in the form of at least one strip extending perpendicular to the longitudinal direction of the capillary, onto the surface of a support with a support surface material having a smaller contact angle in relation to water, preferably 0°<α<30°, applying at least one reagent to the surface of the support material between the strips of delay material, applying linear side boundaries in the longitudinal direction of the capillary, substantially along the entire length of the support, these partially covering the delay material and, if appropriate, the at least one reagent, applying a cover layer, which is secured on the linear side boundaries, and dividing off at least one capillary for individual test elements.

The delay material is a material from the following group: polyethylene, polyethylene terephthalate, polyamides, polycarbonate, acrylonitrile-butadiene-styrene or polyvinyl chloride.

The support surface material is a material applied as a layer to the support, containing an element oxidized at least on the surface with boiling water or steam or an alloy at least oxidized on the surface, the element deriving from the group Al, Si, Ti, V, Cr, Mn, Fe, Cu, Ni, Zn, Ga, Ge, Zr, Nb, Cd, In, Sn, Sb, or the alloy containing at least two elements from the group Al, Si, Ti, V, Cr, Mn, Fe, Cu, Ni, Zn, Ga, Ge, Zr, Nb, Cd, In, Sn, Sb, Mg, Ca, Sr, Ba. The material is AluOx with a contact angle α in relation to water of <10°. The support coated with this support surface material consists for example of plastic, metal, glass, ceramic, paper, nonwoven fabric or cardboard. The longitudinal direction of the capillary corresponds to the transport direction in which the liquid sample is moved through the capillary by capillary forces. The width of the respective strip of material having a greater contact angle in relation to water corresponds to the length of the respective delay zone in the capillary of the finished test element. The at least one reagent is applied between the strips onto the support surface material in the areas where the reaction, enrichment or detection zones are situated in the finished capillary. The thickness of the side boundaries determines the active capillary height of the finished capillary. They serve as side walls of the individual capillaries and as spacers between the support and the cover layer. The thickness of the side boundaries preferably lies between 10 and 300 μm. The cover layer preferably has a surface directed towards the inside of the capillary and made of a material with a contact angle in relation to water of >30°, for example polyethylene, polyethylene terephthalate, polyamides, polycarbonate, acrylonitrile-butadiene-styrene, polystyrene or polyvinyl chloride. The inner surface of the cover layer can, however, also comprise a material with which water forms a smaller contact angle. By application of the cover layer, capillaries of substantially rectangular cross section are generated whose inside walls are delimited by the material of the side boundaries, the support surface material alternating with strips of delay material, and the surface material of the cover layer. One or more parallel capillaries can now be divided off, for example by cuts made in the longitudinal direction in the area of the side boundaries.

The delay material is preferably applied to the support surface material by one of the following methods: coating from the gaseous state or vaporous state, coating from the liquid, pulp or pasty state, coating from the ionized state by electrolytic or chemical cutting, or coating from the solid state, i.e. granular or powder state, for example powder coating, or coating by sintering.

The side boundaries and the cover layer are applied by adhesive bonding or welding. The side boundaries are made up of two-sided adhesive tape, i.e. adhesive tape with two adhesive sides.

The test element according to the invention can be used for spatial separation of reagents for preliminary reactions, suppression reactions, enrichment of substances, and separation of reagents due to incompatibility, and for temporal separation of reactions of a liquid sample with these reagents.

These and other features and advantages of the present invention will be more fully understood from the following detailed description of the invention taken together with the accompanying claims. It is noted that the scope of the claims is definitely by the recitations therein and not by the specific discussion of the features and advantages set forth in the present description.

BRIEF DESCRIPTION OF THE DRAWINGS

The invention is explained in more detail below with reference to the drawing, in which.

Skilled artisans appreciate that elements in the figures are illustrated for simplicity and clarity and have not necessarily been drawn to scale. For example, the dimensions of some of the elements in the figure may be exaggerated relative to other elements to help improve understanding of the embodiment (s) of the present invention.

In order that the invention may be more readily understood, reference is made to the following examples, which are intended to illustrate the invention, but not limit the scope thereof.

DETAILED DESCRIPTION

The following description of the preferred embodiment is merely exemplary in nature and is in no way intended to limit the invention or its application or uses.

Figure 1:
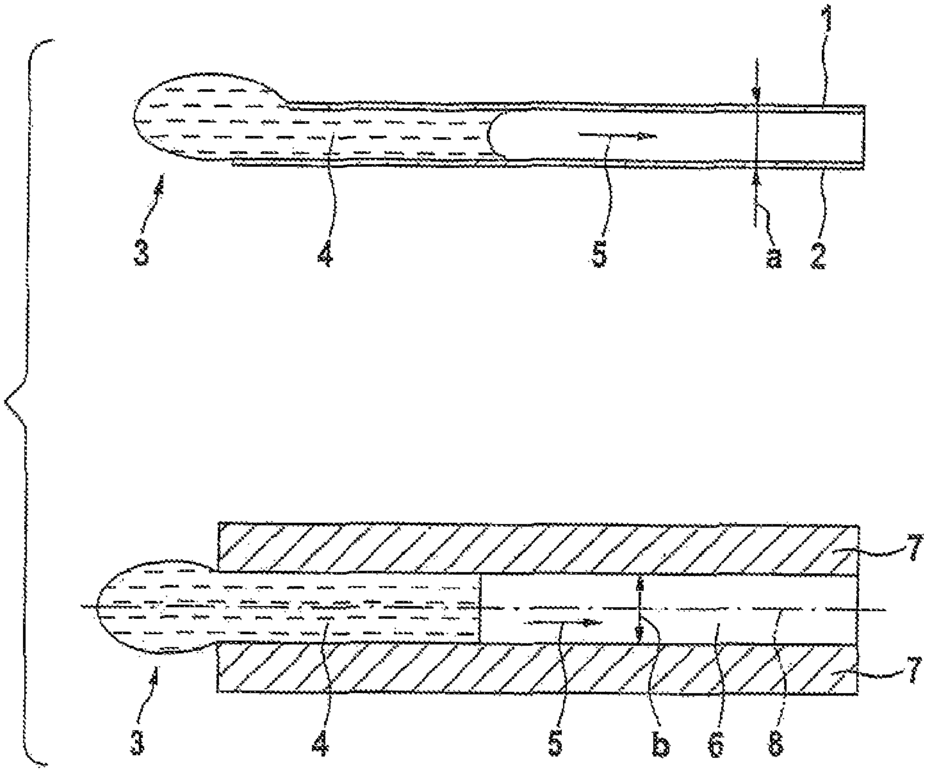
FIG. 1 is a schematic view of a test element from the prior art, with a capillary having a substantially rectangular cross section.

FIG. 1 is a schematic representation of a test element from the prior art, with a capillary having a substantially rectangular cross section. Such a capillary is known from WO 99/29435, for example. A side view of the test element in cross section is shown in the top part of FIG. 1. This shows the two inside walls 1, 2 delimiting the capillary at the top and bottom. These inside walls 1, 2 are separated from one another by a distance a which is so small that the arrangement shown acts as a capillary. The distance a is preferably between 10 and 300 μm. From a sample application area 3 of the test element, a liquid sample 4 is moved by capillary forces through the capillary in the transport direction 5 (longitudinal direction).

The bottom part of FIG. 1 shows the plan view of the test element from the top part. Here, the view in the top part represents the cross section along the line of symmetry 8. The cover layer (upper side wall 1) can be seen through in this view. The channel 6, in which the sample 4 moves in the transport direction 5, is delimited laterally by side boundaries 7. The width b of the channel 6 is greater than the distance a separating the upper and lower inside walls 1, 2. It is chosen so that a desired volume of the sample 4 can be received in the channel 6.

Figure 2:
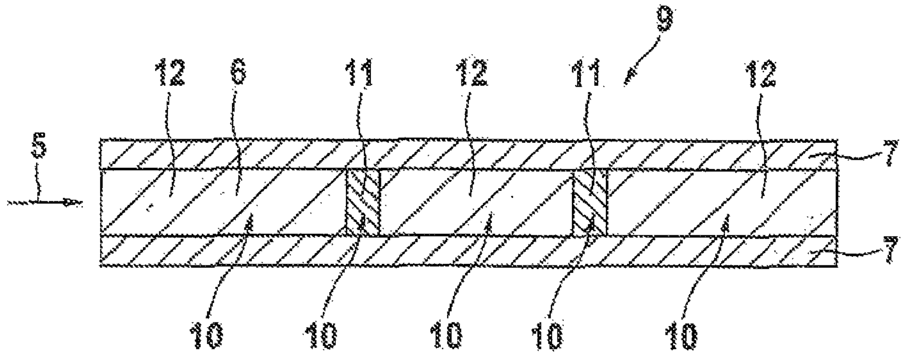
FIG. 2 shows the plan view of a capillary for a test element according to the invention.

FIG. 2 is a schematic plan view of a capillary for a test element according to the invention.

The capillary 9 likewise has a substantially rectangular cross section. In this view, it is again possible to see through the cover layer, so that the inside of the capillary is visible. A channel 6 is delimited by side boundaries 7. Various zones 10 are formed in the capillary 9. These zones 10 contain different materials with which water forms different contact angles. In the delay zones 11, the contact angle is preferably >30°, in particular between 50° and 85°. A sample, moving in the transport direction 5 through the channel 6 because of the capillary forces, is delayed in these zones. Because of the large contact angle, it passes through the delay zones 11 only slowly.

In the reaction, enrichment and detection zones 12, the contact angle is <30°. The surface material in these zones 12 is preferably oxidized aluminium with a contact angle of $\alpha$<10°. The zones 12 therefore fill quickly with liquid sample, which is drawn into the capillary in the transport direction 5. The zones 12 contain reagents (indicated by hatching) which, as the capillary fills with the liquid sample, are dissolved and react with said sample. By means of the alternating sequence of rapidly floodable zones 12 and slowly floodable zones 11 in the transport direction 5, the reactions taking place with the sample in the zones 12 are separated from one another spatially and in terms of time. After application of the sample at the tip of the capillary, the first reaction zone 12 fills up. The front edge of the liquid then flows very slowly across the delay strips 11, while the sample dissolves the reagents and thus, if appropriate, starts a preliminary reaction. After a period of time defined by the arrangement, the front edge of the liquid reaches the second reaction zone 12, which in turn is rapidly flooded. Further steps take place analogously.

The last zone is, for example, a detection zone 12 which is measured photometrically (reflection or transmission) or contains other detection elements such as electrochemical sensors. A detection element (not shown), for example a reaction film, or a chromatography matrix can also be mounted at the end of the capillary. The very slow flooding of the delay zones 11 is dependent on the surface tension (and the resulting contact angle with water $\alpha$) of the delay zones 11, on the surface tension (and the resulting contact angle with water $\alpha$) of the cover layer, on the width of the delay zones 11, and the surface tension of the sample. From this dependency, it is possible to optimize different configurations adapted to the particular needs, in particular to adapt them to the volume required for the detection, the required delay time, and the number of reaction, enrichment or detection steps. Consequently, the delay time can be set by, inter alia, the material and the width of the delay zone. Fairly small contact angles on the delay zone 11 and the cover layer (not shown), together with a fairly wide delay zone 11, results in a fairly "mild" delay. A stronger delay in filling of the capillary is achieved with somewhat narrow delay zones 11 and somewhat steeper contact angles on the cover layer (not shown) and on the delay zones 11.

The figures described below demonstrate schematically some of the steps in the method according to the invention for producing capillaries for test elements.

Figure 3:
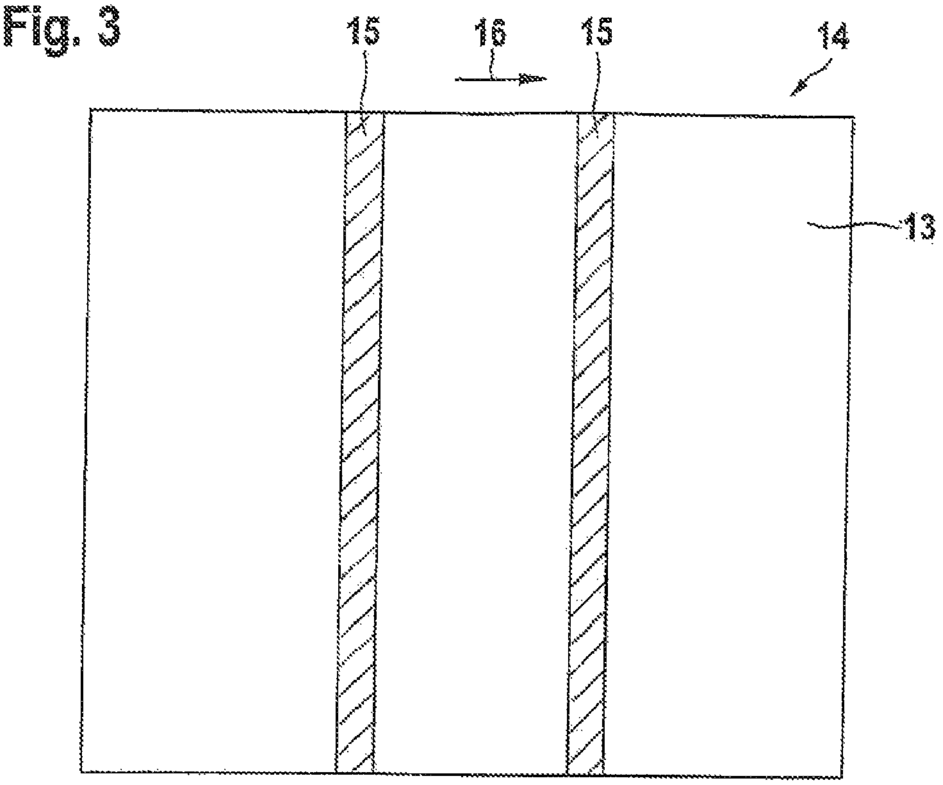
FIG. 3 shows the application of the delay material to the support surface by the method according to the invention.

FIG. 3 shows the application of the delay material to the support surface.

On the support surface 13, water forms a smaller contact angle, preferably $\alpha$<30°. The support surface is preferably composed of oxidized aluminium. The length and width of the support 14 depend on the length and number of the capillaries to be produced. Delay material 15, with which water forms a greater contact angle, preferably $\alpha$>30°, is printed in strips onto the support surface 13. To do this, one of the following methods is used: ink-jet method, coating with rollers, e.g. engraved rollers, flexographic printing, screen printing, pad printing, flow or cast technology using a liquid solution of the delay material 15. This delay material 15 forms the delay zones in the finished capillary, the width of the printed-on strips corresponding to the length of the delay zones in the longitudinal direction 16 of the capillaries. The delay material 15 is preferably applied to the support 14 by one of the following methods: coating from the gaseous, vaporous, liquid, pulp, paste, ionized, solid or powder state.

Figure 4:
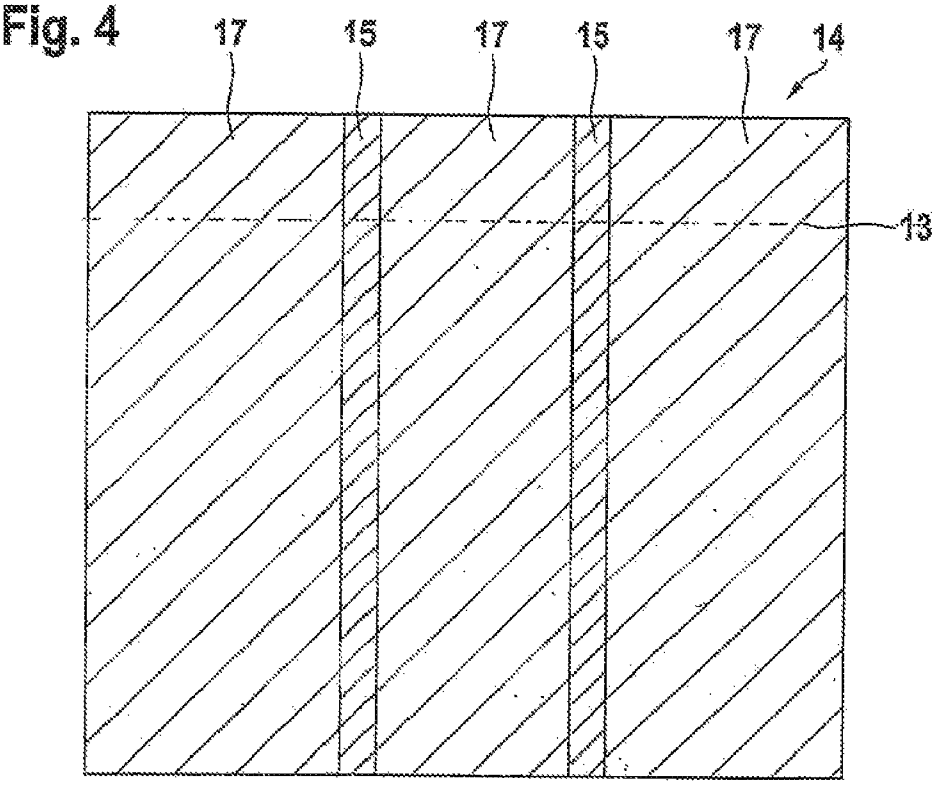
FIG. 4 shows the application of the reagents to the support surface by the method according to the invention.

FIG. 4 shows the application of the reagents to the support surface.

The reagents 17 (shown by hatching) are applied to those areas of the support surface 13 in which no delay material 15 is present. These areas form the reaction, enrichment or detection zones in the finished capillaries.

Figure 5:
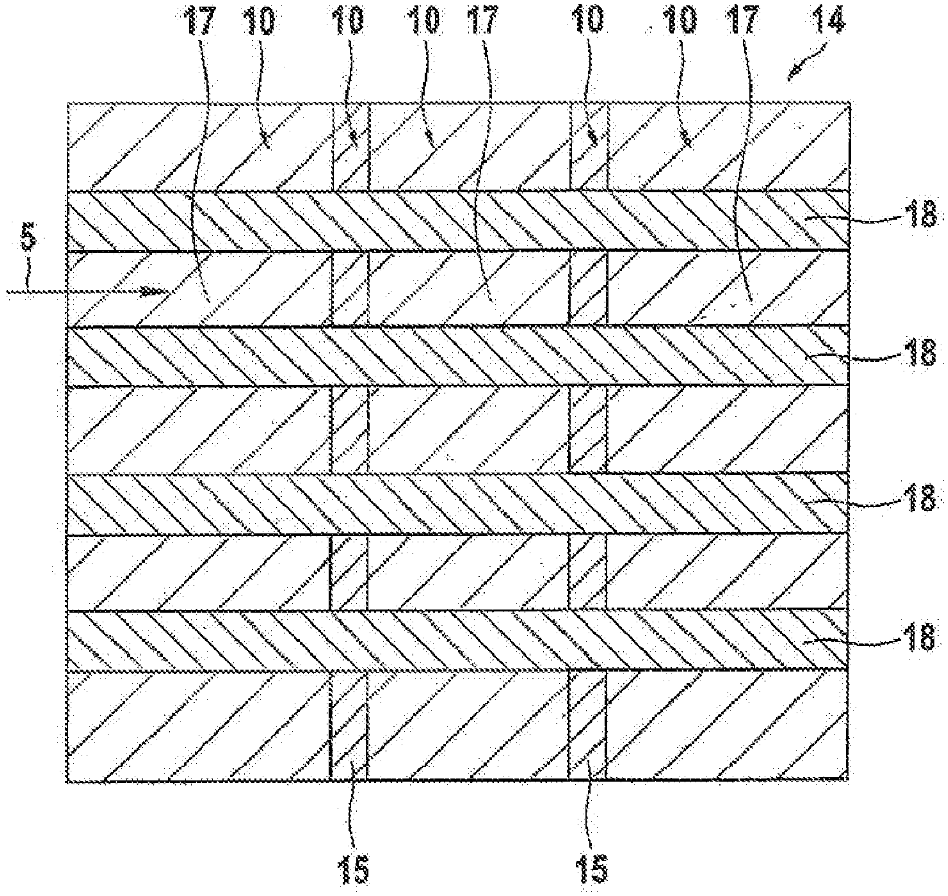
FIG. 5 shows the application of the linear side boundaries by the method according to the invention.

FIG. 5 shows the application of the linear side boundaries to the support.

The linear side boundaries 18 are connected to the support 14 perpendicularly with respect to the strip-shaped delay material 15 and at a certain distance from and parallel to one another. The distance of the side boundaries 18 from one another in this case defines the width of the channel 6 of the respective capillary. Between two side boundaries 18, there are now zones 10 which, in the transport direction 5, alternately contain reagents 17 on the support surface material and delay material 15. The side boundaries 18 are preferably applied by adhesive bonding or welding. The side boundaries 18 are particularly preferably a two-sided adhesive tape which is stuck onto the support 14.

The subsequent steps for finishing the capillary are not shown in the figures. The cover layer is next applied to the linear side boundaries 18 and connected firmly to them, for example by adhesive bonding or welding. The inwardly directed face of the cover layer (not shown) can in this case be made of the same material (delay material 15) as the delay zones or as the support surface 13 or can also contain reagents. If this face of the cover layer contains the support surface material, however, the delay material applied to the support must be mirrored by delay material likewise applied to the face of the cover layer, in order to avoid rapid flooding of the delay zones of the capillary. At least one capillary is then cut off, for example by cuts made in longitudinal direction 5 in the middle of the side boundaries 18. In this way, individual capillaries (as shown in FIG. 2), or several capillaries extending parallel to one another, are produced for a test element.

The method according to the invention described with reference to FIGS. 3 to 5 for producing capillaries for test elements can also be modified so that, in method step (A), a material with a smaller contact angle in relation to water is applied in the form of strips to a support surface with a greater contact angle in relation to water (delay material). Those areas of the support surface not covered by the material with the smaller contact angle can then form the delay zones in the capillary.

The invention therefore relates to a method for producing capillaries (9) for test elements, with the following method steps:

applying at least one material, with a first contact angle in relation to water and in the form of at least one strip extending perpendicular to the longitudinal direction of the capillary, onto the surface of a support (14) comprising a support surface material with a second contact angle in relation to water, applying at least one reagent (17) to the support surface material or to the at least one strip, applying linear side boundaries (7, 18) in the longitudinal direction (16) of the capillary (9), substantially along the entire length of the support (14), applying a cover layer, which is secured on the linear side boundaries (7, 18), and dividing of at least one capillary (9) for individual test elements.

The material with the first contact angle is preferably a delay material with a greater contact angle, and the support surface material with the second contact angle is preferably a material with a smaller contact angle. However, it is also possible for the first contact angle to be smaller and for the second contact angle to be greater, for example by using a PET film onto which a layer with a small contact angle, e.g. metal oxide, is applied (e.g. vapour-deposited).

The at least one reagent (17) can be applied not to the support surface material or to the strip, but instead to the cover layer, before the latter is secured to the side boundaries in step (D).

Examples of Use

The test elements according to the invention can be used, for example, for the following reactions:

Detection of creatine kinase (enzyme, abbreviation CK) in blood plasma

The following reaction cascade serves for photometric detection (not stoichiometrically balanced):

Enzyme activation:

CK (partially inactive)+NAC→CK activated+NAC disulphide

Detection:

$$\text{Creatine phosphate} + \text{ADP} \xleftrightarrow{\text{CK}} \text{creatine} + \text{ATP}$$

$$\text{ATP} + \text{glycerol} \xrightarrow{\text{GK}} \text{glycerol-3-phosphate} + \text{ADP}$$

$$\text{Glycerol-3-phosphate} + O_2 + H_2O \xrightarrow{\text{GPO}} \text{dihydroxyacetone phosphate} + H_2O_2$$

$$H_2O_2 + \text{indicator (reduced)} \xrightarrow{\text{POD}} \text{indicator (oxidized)} + H_2O$$

The usual redox indicators, in oxidized form, are coloured in the visible range, i.e. colour is generated during the detection. The abbreviations indicated above the reaction arrows are enzymes that catalyze the reaction. In producing rapid tests for this detection, the following problems arise:

The activation of CK with NAC must be separated in time and spatially from the detection cascade, since otherwise the conversion may be exhausted even before the enzyme is sufficiently activated.

NAC is stable on storage in weakly acid medium, creatine phosphate in weakly alkaline medium. With a wrong pH, the substances are relatively unstable, i.e. the test no longer functions.

It is expedient for the substrate creatine phosphate to be kept separate for some time before the cascade takes place.

Therefore, the use of the test elements for these reactions is very advantageous. For example, a test element with a capillary with three zones can be used, said three zones being separated by two delay zones. In the first zone, NAC is present in a weakly acid medium. The second zone contains creatine phosphate in a weakly alkaline medium. The third zone comprises the detection cascade, since GK, GPO, POD, ADP, glycerol and the indicator (reduced) are buffered neutrally on the surface there. To fix the reagents, a readily water-soluble polymer can be used as matrix in addition to the printed-on reagent solutions. The test can be measured photometrically in the third zone.

In a test element of this kind, the reaction takes place as follows:

The first zone fills with blood plasma. NAC is dissolved and activates the enzyme that is to be detected. After a short delay time, the content passes from the first zone into the second zone, while at the same time blood plasma or any desired rinsing fluid is introduced into the first zone so that the capillary continues to fill. In the second zone, creatine phosphate is dissolved in the sample. After a short dwell time, the third zone is flooded. The detection takes place in the third zone. So that the capillary inlet does not have to be held in the sample throughout the entire filling process, a small surface or cup providing a sufficient reservoir for all 3 zones can be arranged in front of the inlet.

The example includes a preliminary reaction (activation), reagent separation, enrichment, and a detection reaction.

NAC and creatine phosphate are (as has been mentioned) spatially separated, since they cope well in different buffered environments and can thus be stored over a reasonably long time.

Detection of Creatinine in Blood Plasma

Reaction cascade for photometric detection (not stoichiometrically balanced):

$$\text{creatinine} + H_2O \xrightarrow{\text{creatininase}} \text{creatine}$$

$$\text{creatine} + H_2O \xrightarrow{\text{creatinase}} \text{sarcosine} + \text{urea}$$

$$\text{sarcosine} + O_2 + H_2O \xrightarrow{\text{sarcosine oxidase}} \text{glycine} + H_2O_2 + \text{formaldehyde}$$

$$H_2O_2 + \text{indicator (reduced) peroxidase} \longrightarrow \text{indicator (oxidized)} + H_2O$$

However, since creatine is also present in the blood plasma, this would cause a false positive signal to be generated. One solution is to allow the creatine of the sample to react first according to the following equation.

Elimination of endogenous creatine:

$$\text{Creatine} + H_2O \xrightarrow{\text{creatinase}} \text{sarcosine} + \text{urea}$$

$$\text{Sarcosine} + O_2 + H_2O \xrightarrow{\text{sarcosine oxidase}} \text{glycine} + H_2O_2 + \text{formaldehyde}$$

$$\xrightarrow{H_2O_2} \text{catalase} \quad H_2O_2 + O_2$$

The peroxidase (POD) has a considerably lower Michaelis constant for $H_2O_2$ than the catalase, i.e. a much higher affinity. This means that as long as only catalase is present, and not POD/indicator, the $H_2O_2$ gives a blank reaction.

With POD/indicator, the catalase no longer plays a role. $H_2O_2$ oxidizes the indicator.

In a first zone of a test element according to the invention in which creatinase, sarcosine oxidase and catalase are dissolved in the blood plasma sample, creatine therefore advantageously reacts. After sufficient time has elapsed, a second zone floods with creatinase, POD and indicator and creatinine converts indicator via the cascade. The first zone and the second zone are separated by a delay zone.

It is noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modification and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A test element for testing a liquid sample, the test element comprising:

at least one capillary configured to provide continuous transport of the liquid sample in a transport direction; and a plurality of zones succeeding one another in the transport direction in the capillary, the plurality of zones containing surface materials with smaller contact angles with water and surface materials with larger contact angles with water, the smaller contact angles being in the range of between 0° and 30°, and the larger contact angles being in the range of between 30° and 90°;

wherein the plurality of zones include a first zone with a first hydrophilicity, followed by a second zone with a second hydrophilicity that is different from the first hydrophilicity, followed by a third zone with a third hydrophilicity that is different from the second hydrophilicity, at least one of the first, second and third zones being a reagent zone and at least one of the first, second and third zones being a delay zone, the reagent zone having a length and a reagent that responds to contact with the sample by one of reacting with the sample, enriching a constituent of the sample, and facilitating detection of one of the constituent and a reaction of the constituent with the reagent, the capillary including at least one inside reagent zone wall along the length of the reagent zone, the at least one inside reagent zone wall having a surface with a smaller contact angle in relation to water, the delay zone being adjacent the reagent zone and having a length, the capillary including at least one inside delay zone wall along the length of the delay zone, the at least one inside delay zone wall having a surface with a coating with a larger contact angle in relation to water thereby slowing the flow of the sample in the transport direction, and the zones in the capillary which comprise surface materials with a smaller contact angle in relation to water contain one of (i) an element oxidized at least on the surface with boiling water or steam, the element deriving from the group consisting of Al, Si, Ti, V, Cr, Mn, Fe, Cu, Ni, Zn, Ga, Ge, Zr, Nb, Cd, In, Sn, and Sb, and (ii) an alloy oxidized at least on the surface, the alloy containing at least two elements from the group consisting of Al, Si, Ti, V, Cr, Mn, Fe, Cu, Ni, Zn, Ga, Ge, Zr, Nb, Cd, In, Sn, Sb, Mg, Ca, Sr, and Ba.

2. The test element according to claim 1, wherein the liquid sample is at least one liquid selected from the group comprising plasma, blood, interstitial fluid, urine, saliva, sweat, or water analysis sample.

3. The test element according to claim 1, wherein the capillary comprises four inside walls and has a substantially constant, rectangular cross section.

4. The test element according to claim 1, wherein the zones in the capillary which comprise surface materials with a larger contact angle in relation to water contain at least one material from the group consisting of polyethylene (PE), polyester, in particular polyethylene terephthalate (PET), polyamides (PA), polycarbonate (PC), acrylonitrile-butadiene-styrene (ABS), polystyrene (PS), polyvinyl chloride (PVC), cellulose derivatives, polyvinyl pyrrolidone (PVP), polyvinyl alcohols, polyurethanes (PUR), polymethyl methacrylate (PMMA), polypropylene (PP), waxes, fluorinated hydrocarbons, and unpassivated vapour-deposited metal.

5. The test element according to claim 1 wherein the zones in the capillary which comprise surface materials with a smaller contact angle in relation to water contain an element oxidized at least on the surface with boiling water or steam and deriving from the group consisting of Al, Si, Ti, V, Cr, Mn, Fe, Cu, Ni, Zn, Ga, Ge, Zr, Nb, Cd, In, Sn, and Sb.

6. The test element according to claim 1 wherein the zones in the capillary which comprise surface materials with a smaller contact angle in relation to water contain an element oxidized at least on the surface with boiling water or steam, the element being Al.

* * * * *